July 4, 1939.  F. A. FURLONG  2,164,512
HEATING SYSTEM
Filed June 1, 1936   3 Sheets-Sheet 1
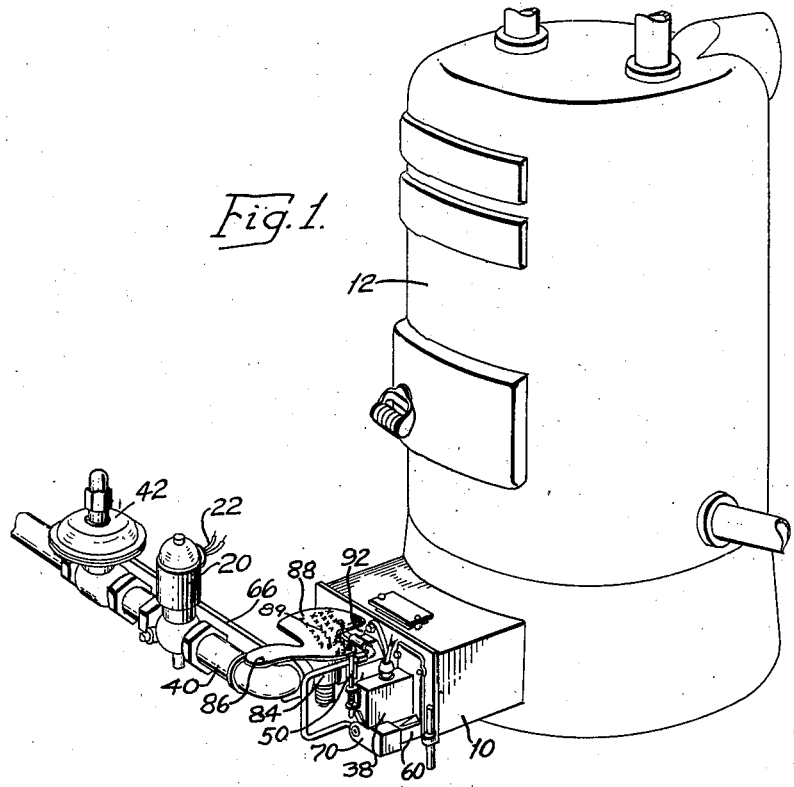
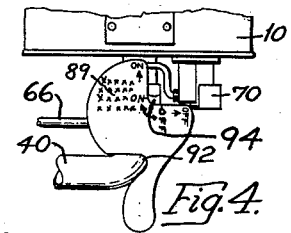
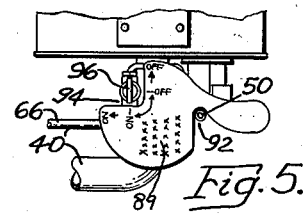
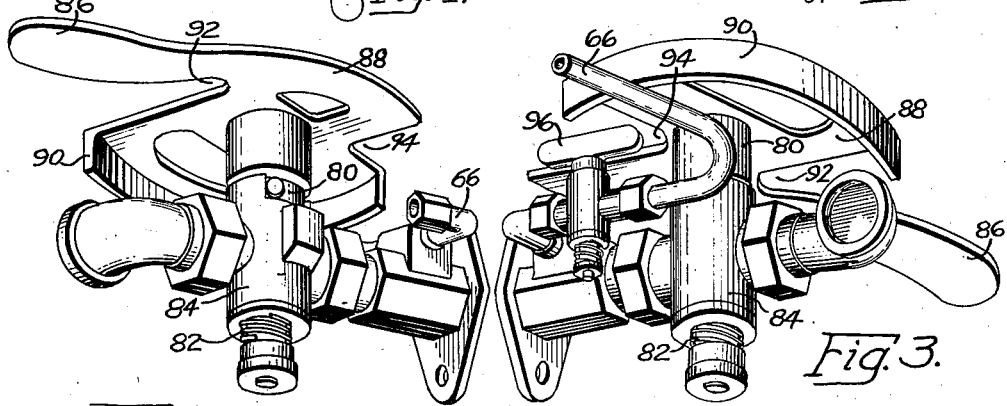
Inventor
Francis A. Furlong
by McConkey & Booth
Attorneys July 4, 1939.　　　F. A. FURLONG　　　2,164,512
HEATING SYSTEM
Filed June 1, 1936　　　3 Sheets-Sheet 2
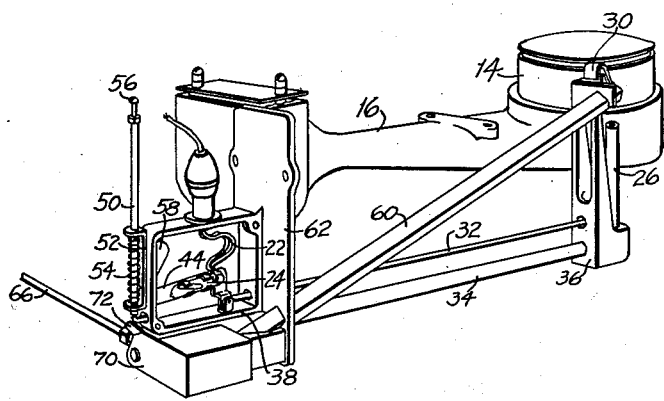
Fig. 6.
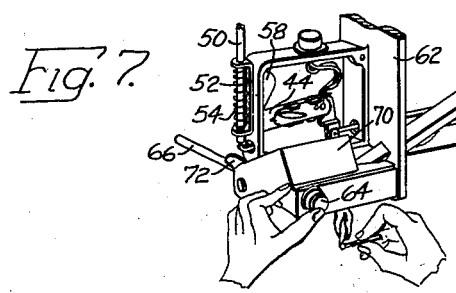
Fig. 7.
Fig. 8.
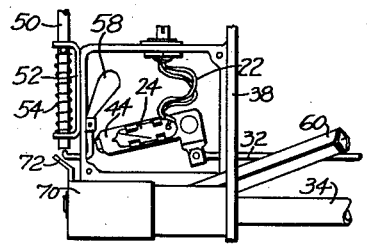
Fig. 9.
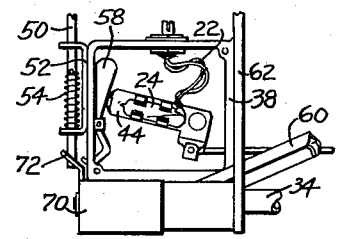
Fig. 10.
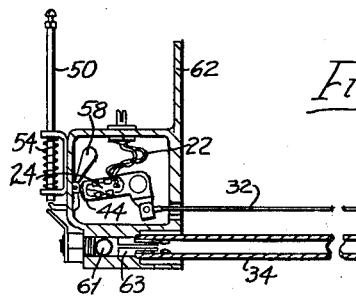
Fig. 11.
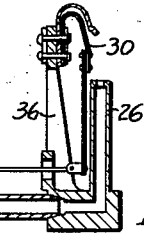
Inventor
Francis A. Furlong
by McConkey & Booth
Attorneys July 4, 1939.  F. A. FURLONG  2,164,512
HEATING SYSTEM
Filed June 1, 1936   3 Sheets-Sheet 3

Inventor
Francis A. Furlong
by McConkey & Booth
Attorneys

Patented July 4, 1939

2,164,512

UNITED STATES PATENT OFFICE 2,164,512

HEATING SYSTEM

Francis A. Furlong, River Forest, Ill., assignor to Autogas Corporation, Chicago, Ill., a corporation of Delaware Application June 1, 1936, Serial No. 82,786

9 Claims. (Cl. 158—117.1)

The present invention relates to heating systems, and is illustrated as embodied in a heating plan having a gas-fired burner of the conversion type.

An object of the invention is to provide a simple but effective system of interlocking safety controls for such a heating plant, whether of the type illustrated or of some equivalent type. The heater is preferably provided with a pilot burner having a lighter, and one feature of the invention relates to interlocking the lighter with the main fuel valve to prevent operation of the lighter unless the fuel supply for the main burner is turned off. I prefer to provide auxiliary means so arranged that the lighter cannot be operated even after the main fuel valve is turned off until sufficient time has elapsed for the dissipation up the chimney of any unburned fuel that may have collected in the furnace.

Another feature of the invention relates to the provision of an interlock for the main fuel valve which is actuated by a thermostatic device controlled by the pilot flame, and which prevents the reopening of the main fuel valve until the pilot is actually burning.

The interlock may also be arranged to prevent turning on the fuel supply for the pilot in the fall, and turning it off again in the spring, unless the main fuel supply is turned off.

The above and other objects and features of the invention, including various novel arrangements and desirable mechanical constructions, and in particular the use of a specially-arranged yielding plunger cooperating with a novel control plate carried by the valve handle and which carries out the various interlocking functions, will be apparent from the following description of the illustrative embodiments shown in the accompanying drawings, in which:

Figure 1 is a perspective view of a heating plant embodying the invention;

Figures 2 and 3 are perspective views of opposite sides of the novel main fuel valve;

Figures 4 and 5 are detail plan views of the valve and associated parts, with the valve in on and off positions respectively;

Figure 6 is a perspective view of the parts of the conversion burner, with the outer casing removed;

Figure 7 is a perspective view of the lighter, showing the pilot being lighted;

Figure 8 is a perspective view of the end of the lighter tube;

Figures 9 and 10 are elevations of the pilot-controlled switch, with the side cover of the switch box removed, and with the switch in off and on positions respectively;

Figure 11 is a section lengthwise through the switch box and the pilot;

Figure 13:
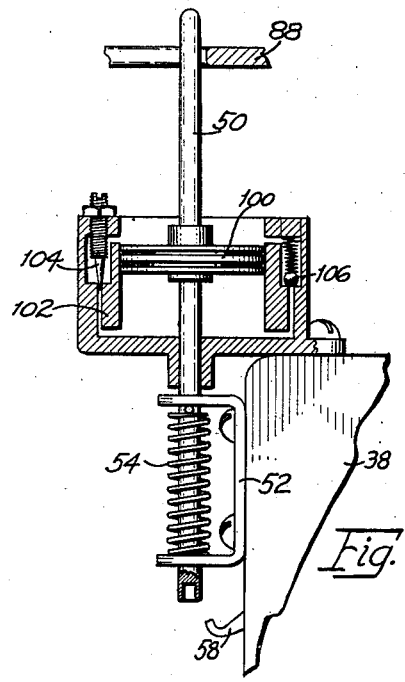
Figure 13 is a section, on an enlarged scale, showing the interlocking plunger associated with a dashpot type of time-delay device.
Figure 12:
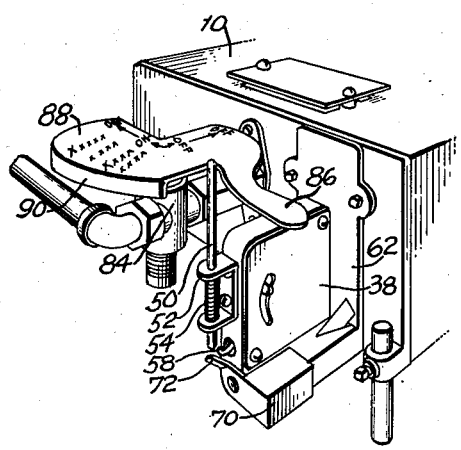
Figure 12 is a perspective view, on a larger scale than Figure 1, of the end of the conversion burner which is outside the furnace.

The illustrated heating plant includes a heater such as a conversion burner, the casing which is indicated at 10, arranged in the ashpit of a furnace 12 of any desired type (hot water or hot air or steam), substantially as described in Wetherbee Patent No. 1,919,285, granted July 25, 1933, and in my own prior Patent No. 2,022,033, granted November 26, 1935.

Fuel, which may be gas, is supplied to a main burner 14, arranged to heat to incandescence a stack of ceramic radiants as described in the above-identified Wetherbee patent, through an elongated gas and primary air mixing Venturi tube 16, the secondary air being supplied through the surrounding casing 10.

In the arrangement illustrated, there are two fuel-control valves for the main burner 14, one being a manually-operated valve hereinafter described in detail, and the other a standard automatic electrically-operated valve 20 having electric connections 22. These connections form part of a control system including a room thermostat (not shown) and a safety switch 24, shown as a pivoted pilot-controlled safety switch which opens the circuit (thereby closing the valve 20) when the pilot goes out. The control system may be the system fully described, and claimed, in my copending application No. 679,521, filed July 8, 1933.

The heater is provided with a pilot burner 26 arranged, in any desired manner, to light the main burner 14 whenever the main fuel supply is turned on.

Arranged to be controlled by the presence or absence of a flame on the pilot burner 26 is a two-piece loop-shaped bi-metallic thermostat 30 pivotally connected at its lower end (as described in said application No. 679,521) to an actuating rod or the like 32. The pilot burner may be supplied with fuel through a pipe 34 which also serves as a rigid connection between a head 36 carrying the thermostat 30 and a safety switch control box 38.

The pipe 66 conects to the main fuel line 40 between the usual pressure regulator 42 and the automatic valve 20 (or ahead of the pressure regulator 42 if desired), so that the fuel for the pilot is not controlled by the automatic valve 20.

The thermostatically-actuated rod 32 is connected to a pivoted support or lever 44 carrying the mercury switch 24, and when the pilot goes out it tilts the switch to the open position shown in Figure 9. When the pilot is burning, the thermostat heats up and tilts the switch to the closed position of Figure 10, in which position the automatic valve is directly controlled by the room thermostat as described in said application No. 679,521, and as described in my said Patent No. 2,022,033.

It will be apparent that if switch 24 is not closed, no fuel can reach the main burner 14, this being the case when the pilot goes out.

The heater is provided with novel safety means associated with the above-described parts or their equivalents, and which in the illustrated embodiment includes a safety plunger 50 guided vertically in a support 52 on the front of the control box 38, and urged upwardly by means such as a spring 54.

The thermostatic means is preferably provided with a safety pawl or the like 58, having a cam surface engaged by the lever 44 to hold the pawl in inoperative position as shown in Figure 10 when the pilot is burning, and swung (e. g., by gravity) into the position of Figure 9 when the pilot goes out.

In this latter position, the pawl locks the safety plunger 50 in its upper position if it is already in that position, while if the plunger is in its lower position the pawl slidably engages the side of the plunger and swings under the end of the plunger to lock it as soon as it is raised to its upper position.

In order to facilitate lighting the pilot burner 26, a lighter tube 60 is mounted at one end on the head 36 and at the other end on a support 62 which carries the switch box 38 and which forms part of the end of the casing 10 outside the furnace 12. The lighter tube is inclined upwardly, and terminates adjacent and above the pilot burner 26, so that a flame issuing from the upper end of the lighter will ignite the pilot burner.

The lighter tube 60 receives its fuel at its lower end, under the control of a spring-closed push-button 64 from a pipe 66 which also feeds the pilot burner pipe 34, and receives the air necessary for combustion of the fuel from an opening 68 along its bottom (Figure 8). With the valve 64 open and a match held below the lower end of the opening 68, the mixture within the tube is ignited, the flame traveling up the tube and igniting the pilot burner inside the furnace.

The lighter is shown provided with a pivoted guard 70 which normally covers the valve 64, and which must be lifted in order to operate the lighter. The guard 70 is shown provided with a projection 72 which engages the safety plunger 50 if the latter is in its lower position, so that the lighter cannot be operated unless the plunger 50 is raised.

Between the automatic valve 20 and the main burner, according to an important feature of the present invention, I arrange a manually-operable valve, such as a rotatable plug valve 80, slightly conical in form and held against its seat by a spring 82. The casing 84 of this valve is connected on one side to the fuel conduit 40 and on the other side to the mixing tube 16.

The valve 80 is arranged to be rotated by means such as a handle 86 provided with (and shown as integral with) a control plate 88, which may if desired have a depending peripheral flange 90.

At one side, the control plate is formed with a recess or notch 92, through which the safety plunger 50 is projected when the valve 80 is in closed position, thereby locking the valve until the plunger is again depressed. As the plunger cannot be depressed unless the pilot is burning, this prevents opening the valve 80 unless the pilot is burning. When the valve 80 is open, on the other hand, the control plate 88 holds the plunger 50 down, and the lighter cannot be operated.

The control plate 88 is also cut away at 94, at such a point that, when the valve 80 is closed, access may be had to a valve 96 for the pilot fuel line 66. Usually this valve is turned on in the fall and off in the spring, and is not touched at other times. The above arrangement insures that the main fuel supply will always be turned off when the pilot fuel control valve 96 is being manipulated.

The control plate 89 preferably bears on its upper surface printed instructions 89, arranged at such an angle that normally (i. e., with the pilot burning and the valve 80 turned on) they face and can readily be read by a person standing in front of and facing the furnace. When the plate 88 is turned to permit the use of the lighter and to close the valve 80, the instructions 89 are at such an angle as to face and be read by a person standing at one side, ready to operate the lighter.

It is desirable in many cases to make sure, after the pilot has gone out, that all the gas has been dissipated from the furnace up the chimney before it is possible to operate the lighter, thus effectively preventing any possibility of an explosion due to trying to light the pilot while the furnace still contains gas.

One arrangement for doing this is shown in Figure 13. In this arrangement, the safety plunger 50 is provided with a dashpot which allows it to rise very slowly, after the valve 80 is shut off, to give the desired time interval before the lighter is unlocked. The illustrated dashpot includes a piston 100 reciprocating in a cylinder 102 to which the admission of air is restricted by an adjustable needle valve 104. When the plunger is depressed, after the pilot is lighted again and it is desired to open the valve 80, the air escapes readily through a check-valve 106, so that the dashpot in no way interferes with this operation.

Figure 14:
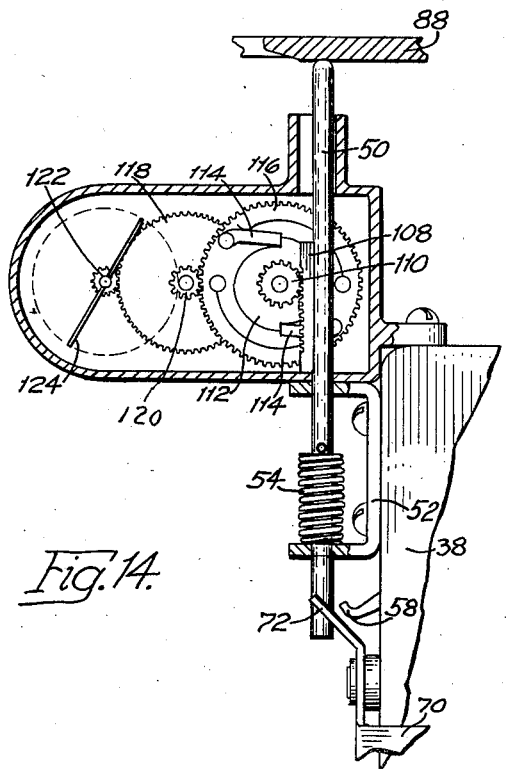
Figure 14 is a similar section of an alternative construction using a rotating-vane type of time-delay device.

In Figure 14, the plunger 50 carries a rack 108 drivably meshing with a pinion 110 secured to a clutch cam 112 having a pair of shoulders having one-way engagement with spring-pressed pawls 114 carried by a large gear 116 which drivably meshes with a small pinion 120 carried by another large gear 118 which drives a pinion 122 rigid with a long two-bladed vane 124. The vane 124 is thus rotated rapidly by upward motion of the plunger 50, to retard such motion, but is not affected by downward motion of the plunger because of the one-way action of the pawls 114.

Figure 15:
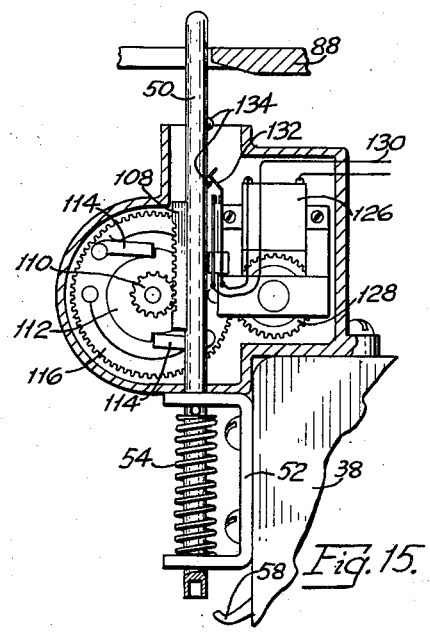
Figure 15 is a section similar to Figures 13 and 14, but showing an electrically-operated type of time delay device.

In Figure 15 a small electric motor 126, such as is used in electric clocks and which is weaker than the spring 54, resists the turning of a gear 128 driven by the gear 116 described above. The circuit 130 for the motor 126 includes spring contacts 132 which are separated in both extremes of motion of the plunger 50 by cams or rounded projections 134 carried by the plunger.

While various illustrative constructions have been described in detail, it is not my intention to limit the scope of the invention by that description, or otherwise than by the terms of the appended claims.

I claim:

1. A heater comprising a main burner having a fuel control valve, a pilot burner, a lighter operatively associated with the pilot burner to light the same, means for preventing operation of the lighter, means for opening and closing said valve, a movably mounted plunger engageable with said two means and having one position in which it interlocks with the first means to prevent operation of the lighter when the valve is turned on and having another position in which it interlocks with the second means to hold said valve closed, a dashpot for delaying movement of said plunger from said one position, and thermostatic means controlled by the flame on the pilot burner and having a part interlocking with said plunger to hold it in said other position unless the pilot is burning.

2. A heater fuel control valve mechanism comprising, in combination with a lighter having a guard which must be moved to operate the lighter, a rotary valve having a handle provided with a control plate cut away to form an interlocking notch at one side and having associated therewith a plunger yieldingly urged toward said plate and held down by said plate in a position preventing movement of the guard when said rotary valve is turned on and which shifts up into said notch to lock the rotary valve and release the guard when the rotary valve is turned off.

3. A heater comprising a main burner having a fuel control valve, a pilot burner associated with the main burner, a lighter operatively associated with the pilot burner to light the same, and means interlocking the valve and said lighter and preventing operation of the lighter unless said valve is turned off, said means including a slow-acting device preventing operation of the lighter for a predetermined time interval after the valve is turned off.

4. A heater comprising a main burner having a fuel control valve, a pilot burner associated with the main burner, a lighter operatively associated with the pilot burner to light the same, means interlocking the valve and said lighter and preventing operation of the lighter unless said valve is turned off, said means including a slow-acting device preventing operation of the lighter for a predetermined time interval after the valve is turned off, and thermostatic means controlled by the flame of the pilot and cooperating with the interlocking means to prevent reopening of said valve until the pilot is lighted.

5. A heater comprising a main burner having a rotary fuel control valve, a pilot burner associated therewith, a lgihter operatively associated with the pilot burner to light the same, a handle for said valve having a control plate formed with an interlocking recess, a guard which in one position prevents operation of the lighter, a plunger held in a first position preventing movement of said guard from its said one position by said plate when said valve is open and which is shifted to a second position releasing the guard and interlocking with said recess to lock the valve when the valve is closed, and means holding said plunger in its first position for a substantial time interval after the valve is turned off before it shifts to said second position.

6. A heater comprising a main burner having a main fuel control valve, a pilot burner associated therewith and having a separate fuel control valve, a lighter operatively associated with the pilot burner to light the same, a handle for said main valve having a control plate formed with an interlocking recess and cut away at one side, a guard which in one position prevents operation of the lighter, a plunger held in a first position preventing movement of said guard from its said one position by said plate when the plate is in a position to cover said separate pilot fuel control valve and to open said main valve and which is shifted to a second position releasing the guard and interlocking with said recess to lock the plate in a position affording access through said cut-away side to said separate pilot fuel control valve when the main valve is closed, and means holding said plunger in its first position for a substantial time interval after the valve is turned off before it shifts to said second position.

7. A heater comprising a main burner having a rotary fuel control valve, a pilot burner associated therewith, a lighter operatively associated with the pilot burner to light the same, a handle for said valve having a control plate formed with an interlocking recess, a guard which in one position prevents operation of the lighter, a plunger held in a first position preventing movement of said guard from its said one position by said plate when said valve is open and which is shifted to a second position releasing the guard and interlocking with said recess to lock the valve when the valve is closed, and means holding said plunger in its first position for a substantial time interval after the valve is turned off before it shifts to said second position, said plunger having a spring urging it from its first toward its second position and said last-named means being constructed and arranged to resist movement of the plunger from first to second position and not to resist manual depression of the plunger from second to first position.

8. A heater comprising a main burner having a main fuel control valve, a pilot burner associated therewith and having a separate fuel control valve, a lighter operatively associated with the pilot burner to light the same, a handle for said main valve having a control plate formed with an interlocking recess and cut away at one side, a guard which in one position prevents operation of the lighter, a plunger held in a first position preventing movement of said guard from its said one position by said plate when the plate is in a position to cover said separate pilot fuel control valve and to open said main valve and which is shifted to a second position releasing the guard and interlocking with said recess to lock the plate in a position affordng access through said cutaway side to said separate pilot fuel control valve when the main valve is closed, and means holding said plunger in its first position for a substantial time interval after the valve is turned off before it shifts to said second position, said plunger having a spring urging it from its first toward its second postion and said last-named means being constructed and arranged to resist movement of the plunger from first to second position and not to resist manual depression of the plunger from second to first position.

9. A heater comprising a main burner having fuel control means, means for igniting said burner including a pilot burner and a lighter for the pilot burner, means interlocking the fuel control means and said lighter and preventing operation of the lighter unless the fuel control means is turned off, and means associated with the interlocking means and delaying its operation when the fuel control means is turned off to prevent operation of the lighter for a substantial time interval after the fuel control means is turned off.

FRANCIS A. FURLONG.